Feb. 23, 1943. A. SOWDEN 2,311,706
MACHINE AND APPARATUS FOR PACKING FLOUR, MILL FEEDS, AND THE LIKE
Filed March 26, 1940 5 Sheets-Sheet 1

Inventor:
Alfred Sowden,

Feb. 23, 1943.  A. SOWDEN  2,311,706
MACHINE AND APPARATUS FOR PACKING FLOUR, MILL FEEDS, AND THE LIKE
Filed March 26, 1940  5 Sheets-Sheet 2

Inventor:
Alfred Sowden,
by [signature]
Atty.

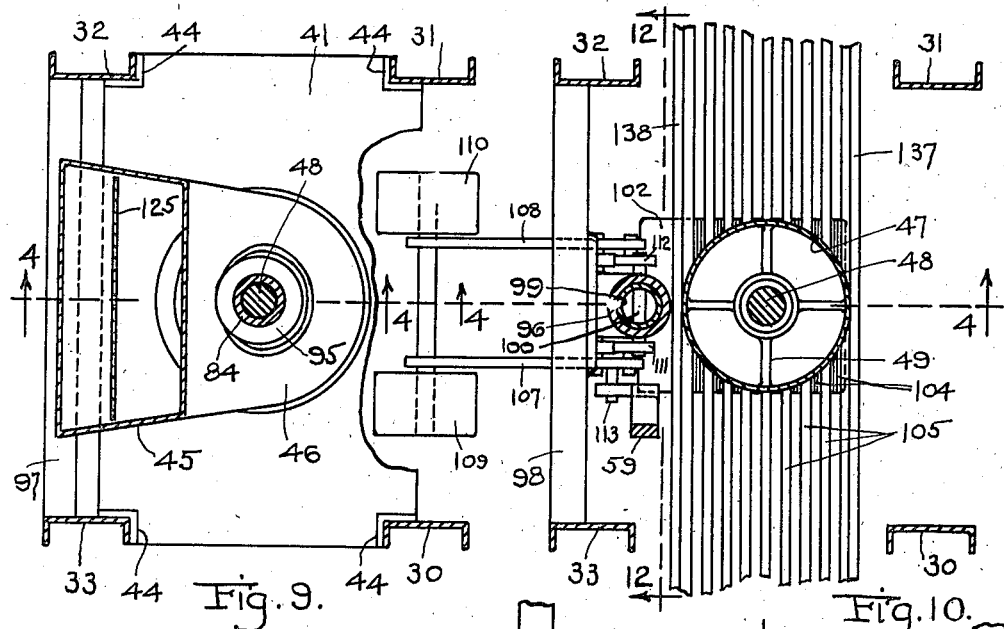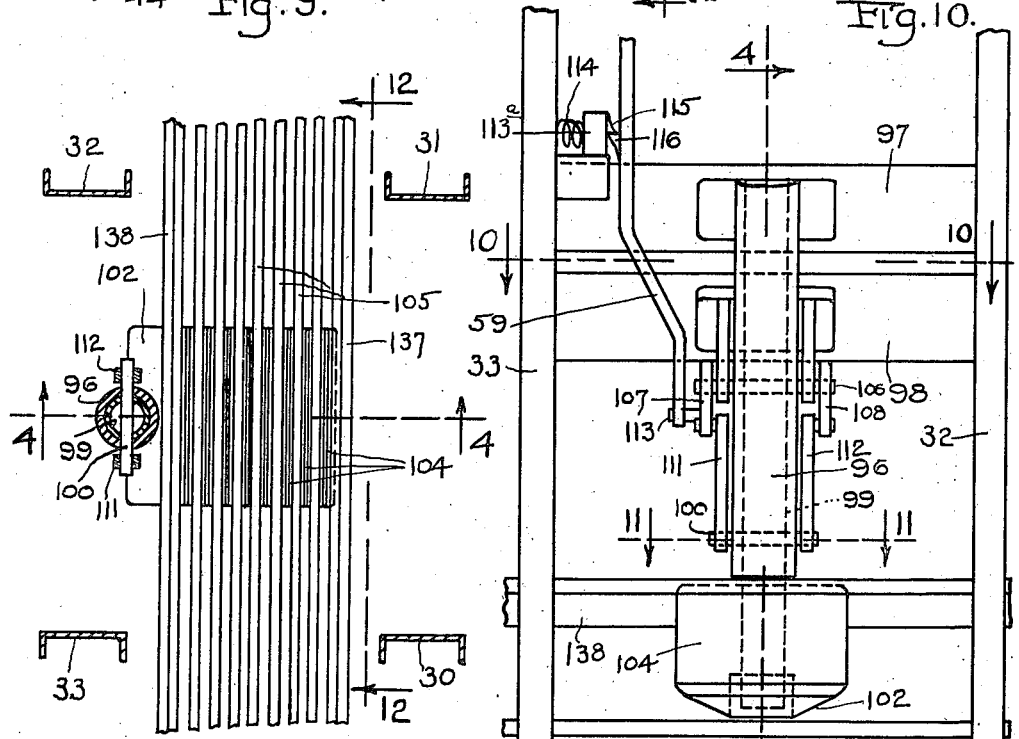

Feb. 23, 1943. A. SOWDEN 2,311,706
MACHINE AND APPARATUS FOR PACKING FLOUR, MILL FEEDS, AND THE LIKE
Filed March 26, 1940 5 Sheets-Sheet 5
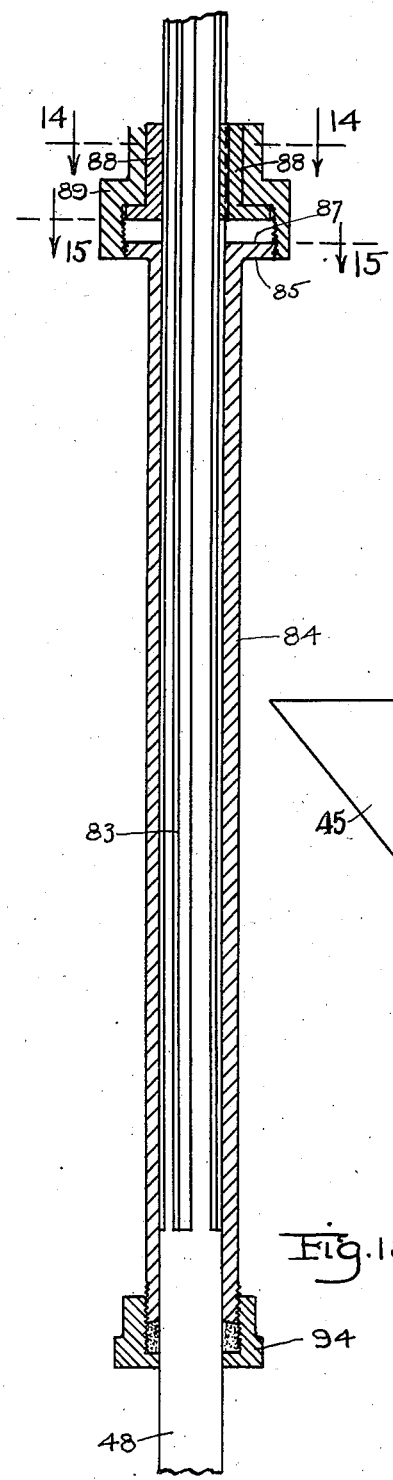
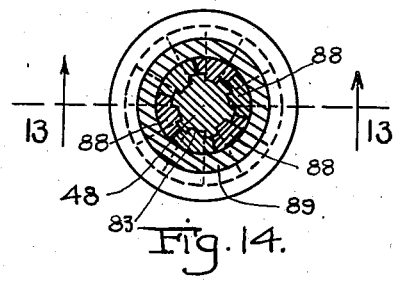
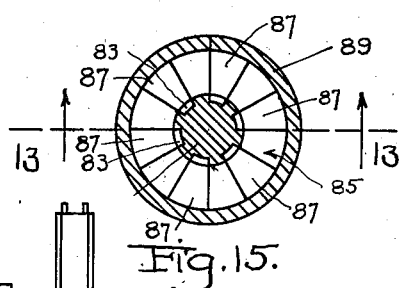
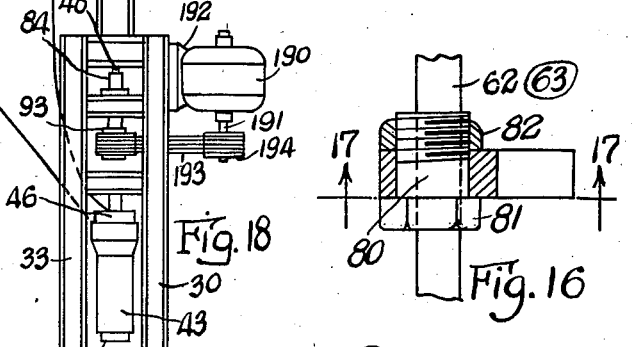
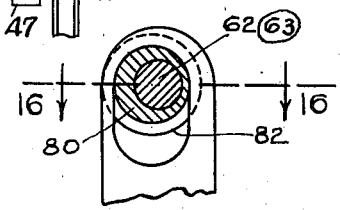
Inventor:
Alfred Sowden, Patented Feb. 23, 1943

2,311,706

UNITED STATES PATENT OFFICE 2,311,706

MACHINE AND APPARATUS FOR PACKING FLOUR, MILLFEEDS, AND THE LIKE

Alfred Sowden, Arkansas City, Kans.

Application March 26, 1940, Serial No. 325,977

11 Claims. (Cl. 226—23)

The present invention has to do with improvements in machines and apparatus for packing such materials as flour, mill feeds, and the like, in particular, but it will appear that these improvements are not limited to these specific uses and materials. Nevertheless, in view of the nature of these materials and the operating conditions imposed by their physical characteristics, the present improvements have been devised especially to meet said conditions and characteristics, and I shall explain the present improvements with particular reference to these and similar materials. In so doing, however, I do not intend to limit myself to these materials, except as I may do so in the claims to follow.

An important object of the present invention is to provide apparatus and machines which are capable of very high rates of operation, considering the nature and characteristics of the materials being handled. It is intended to secure this high rate of operation in the filling and, if desired, the sealing, of bags or sacks of these materials, with a very accurate weighing of the contained materials to a very close tolerance of variation from the intended net weight of contained material. In this connection it is sometimes a further object to accomplish this result in plant operations wherein the machines and apparatus are sometimes called on to operate on flour, and at other times to operate on various mill feeds; so that the same machines and apparatus may be used for all of these materials. Such wide range of usefulness is especially desirable in connection with operations in plants of relatively small size, and wherein the initial investment for such machines and apparatus must be kept within a relatively low figure.

It is a feature of my present invention to provide an improved means to support the bags or containers during the filling and packing operation, in direct conjunction with a suitable form of conveyor so arranged that the bags carried by such support will, at the proper time, be transferred to such conveyor and thereby be carried directly to the sewing or closing stage.

In connection with the foregoing it is a further object of the invention to so arrange the supporting means aforesaid, in relationship to the conveying means, that these two elements may be readily brought into operative relationship for delivery of the bags at either side of the filling and packing machine as needed.

In connection with all the foregoing objects and features I have herein disclosed the details of an improved form of filling and packing apparatus. Machines of this general type are disclosed in Letters Patent of the United States, No. 2,184,-474 issued to me December 26, 1939; and other features thereof are also disclosed in my co-pending applications, Serial No. 273,973, filed May 16, 1939, now Patent No. 2,258,631 issued to me October 14, 1941, and Serial No. 288,736, filed August 7, 1939, allowed January 10, 1940, and now Patent No. 2,216,786, issued to me October 8, 1940. All of the aforesaid earlier applications relate to packers of that general type in which there is provided a rotating auger, carried by a vertically extending shaft, both the auger and shaft being suitably journalled to permit vertical axial movements thereof, said parts rising during the filling and packing movements, and being permitted to descend again at or after the conclusion of such packing movements. Said cases also disclose means to support the bag during the filling operations, together with suitable means to ensure bag release at or after the conclusion of such filling movements.

In the aforementioned co-pending applications I have also disclosed arrangements including telescoping tubes, the lower one of which is adapted to rise and fall with the vertical movements of the auger, so that additional bag support is effected by such lower tube during the filling operations, and also, in some cases, to facilitate aeration of the bag and filling material during the filling and packing operation.

In the said application, Serial No. 273,973, I have also disclosed an improved form of auger for use in connection with such machines as the foregoing, whereby the tendency of the material to be thrown outwardly by centrifugal action with high speeds of auger rotation is effectively resisted, said improved form of auger serving to constantly draw the material beneath it towards the center or axis of rotation, so that very high auger speeds may be used and still secure uniform packing of the entire cross-sectional area of the material beneath the auger.

In the aforesaid application, Serial No. 273,973 I have also disclosed arrangements whereby when the filling and packing operation has been completed so that the auger and shaft have risen to their intended upper limit of movement, "knockoff" occurs, and the supporting platform of other support is released, and the filled and packed bag is allowed to descend for support and transportation by the associated conveyor or the like. In that case I have also disclosed provision for then locking the platform or other support in its so-lowered position, against the action of a suitable counterweight, so that the parts will be retained in such condition until the operator purposely releases such locking means to thereby permit the parts to assume the proper condition for commencement of a new cycle of movements. Nevertheless, in that case the auger and shaft, and the telescoping tube will have moved to their lowered positions during, or immediately after, the bag releasing and lowering action; so that in that case the normal position of the shaft and auger, and the telescoping tube, is the lowered position. Under these conditions the parts must be so designed and placed that even when the telescoping tube is in its lowered position the filled and packed bag may be lowered a distance below the so-lowered telescoped tube, equal to or greater than the height of such filled and packed bag, so that said bag may be carried away laterally from the packer to the next operation. This means that the overall height of such packer is correspondingly large.

When the filling and packing machine is to be fed from overhead bins or hoppers, said bins or hoppers must be located at the proper elevation to deliver the material to the weighing apparatus, and from that apparatus it must then flow by gravity to the entrance chute of the filling and packing machine; so that it is very desirable to be able to bring the elevation of that chute as low as possible in order to lower the elevation of the bins or hoppers themselves. Still it is desired to be able to make use of a filling and packing machine of the high speeds of operation possible by the use of the features disclosed in the aforesaid earlier filed cases.

It is a further object of the present invention to provide means whereby the shaft and auger, and the telescoping tube carried thereby, may be automatically locked in their elevated position at the instant of "knock-off" (namely, the completion of the filling and packing operation), notwithstanding the release of the bag support at such instant, so that the so-filled and packed and released bag may then be almost immediately carried away laterally by the conveying device to the next stage or operation (namely, the sewing or closing and sealing operation), and with only a very small necessary actual lowering of the bag from the position which it occupied during the filling and packing operation. By this means, the necessary over-all elevation of the machine may be reduced substantially as much as the height of the bag, with all the manifest advantages attendant thereon.

In connection with the foregoing feature it is a further object of the invention to provide a very simple and effective means to secure such locking of the parts automatically; and to make provision for simple adjustments of such locking means from time to time as needed to ensure very accurate operations, notwithstanding the expected natural wear and other requirements.

In connection with the foregoing it is a further object of the invention to provide for manual operation of the "knock-off" device, if desired, in order to stop the operations in case of such unusual condition as a false operation wherein a bag is only partially filled, so that the shaft and auger do not reach the normal high position where knock-off will automatically occur, and in which case the machine would otherwise continue indefinitely to rotate without completion of the intended cycle of operations.

A further object of the present invention is to provide an improved form of splined connection between the drive pulley and the shaft. In this connection it is an object to make provision for replacement or adjustment of the splined or keyed portion of the driving element, so that in case of wear, or for other reasons, this part may be readily replaced or adjusted, without the need of complete disassembly of the machine. A further object is to make provision for effectively protecting the splines of the shaft from access of flour or dust or other foreign matter, and, if desired, for effective lubrication of the splined parts. This is an important feature when it is considered that relatively large forces must be transmitted at high speeds of rotation (for example, 1500 to 1750 R. P. M.), and through the vertically sliding shaft and connected parts.

In connection with this feature it is a further object of the invention to provide a driving unit carrying the pulley, and which driving unit is provided with well separated bearings, so that a very effective and satisfactory support is established therefor.

A further feature of the invention relates to the provision of means to ensure a uniform delivery of the material, be it flour, or feed, or what not, to the filling and packing chamber, and to the auger position, such delivery being at a rate sufficient at all times to meet the rate of packing at which the auger is performing its functions; and such uniformity of delivery is assured, notwithstanding the fact that when the cycle of operations commences by release of the weighed portion from the weighing apparatus such release is almost instantaneous, delivering the entire mass of, say one hundred pounds, to the filling and packing elements. By this feature I make it possible to secure the necessary rapidity of operations of the weighing apparatus, releasing the weighed material when a cycle of operations commences, or at a given point in such cycle, so that the new weighing operation may commence without delay; and at the same time the so released mass of pre-weighed material is then fed uniformly to the packing and filling position at the proper rate to meet the requirements thereof. Also to make provision for adjustment of this rate of feed as may be required from time to time, for example, according to the nature of the material being treated.

A further feature of the invention relates to the provision of a motor driven packer arrangement in which the driving motor is located at the side opposite to the inlet chute through which the flour or feed is supplied to the machine. In cases wherein the said chute is relatively high and heavy, or wherein the charges of material to be packed are large, this opposition of placement is of great advantage, as giving a well balanced structure and one which will have a greatly improved stability.

Other objects and uses of the invention will appear from a detailed description of the same, which consists in the features of construction and combinations of parts hereinafter described and claimed.

In the drawings:

Figure 9 shows a horizontal section of the line 9—9 of Figures 1, 2 and 4, looking in the directions of the arrows;

Figure 10 shows a horizontal section on the line 10—10 of Figures 1, 2 and 4, looking in the directions of the arrows;

Figure 11 shows a horizontal section of the line 11—11 of Figures 1, 2 and 4, looking in the directions of the arrows;

Figure 12 shows a staggered vertical section on the line 12—12 of Figure 4, looking in the direction of the arrows, and looking towards the rear of the machine to show the bag support operating mechanism, said mechanism being in the lowered position for transfer of the filled and packed bag to the laterally moving conveyor;

Figure 13 shows a vertical longitudinal section through the drive sleeve unit and the coupling thereof to the shaft splines;

Figure 14 shows a horizontal section on the line 14—14 of Figure 13, looking in the direction of the arrows, and shows the key sections in engagement with the shaft splines;

Figure 15 shows a horizontal section on the line 15—15 of Figure 13, looking in the direction of the arrows, and it shows the clutch faces which are engaged by the key sections shown in Figure 14;

Figure 16 shows a detail of one of the clamp hangers for one of the clamping bars for retaining the shaft head in raised position at the instant of "knock-off";

Figure 17 shows a section on the line 17—17 of Figure 16, looking in the direction of the arrows; and Figure 18 shows a side elevation of the upper portion of a packer embodying my present invention and having a driving motor located and mounted on the front of the packer frame to secure a balanced arrangement and one having great stability, the inlet chute being located and mounted on the back of the packer frame.

Referring first to Figures 1 to 17, inclusive, I shall first describe the filling and packing machine herein disclosed, and thereafter I shall explain the plant layout wherein machines of this type may be used for very high rates of continuous operation.

The filling and packing machine includes a suitable framework, including the four corner posts 30, 31, 32 and 33, respectively. These are conveniently shown as comprising channel shapes, but this is merely a matter of convenience. These four corner posts are connected together in convenient manner to provide a substantially rigid framework, the details of which do not require specific description.

Figure 1:
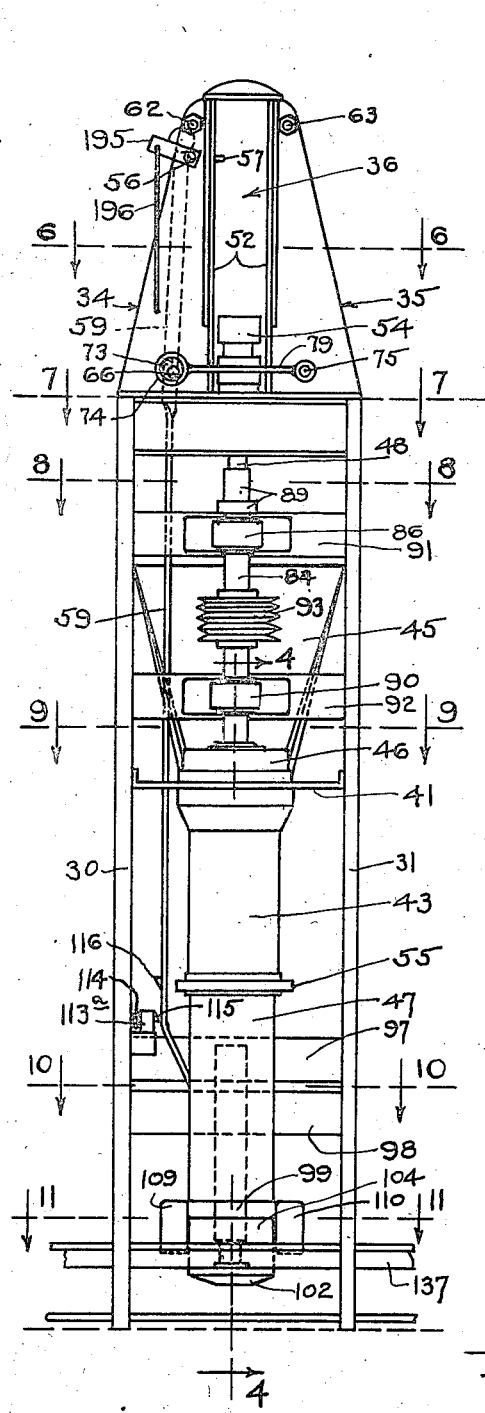
Figure 1 shows a front face view of a typical filling and packing machine embodying features of my present invention, the bag support being in its elevated position, and the latch being released to commence a cycle of operations.
Figure 2:
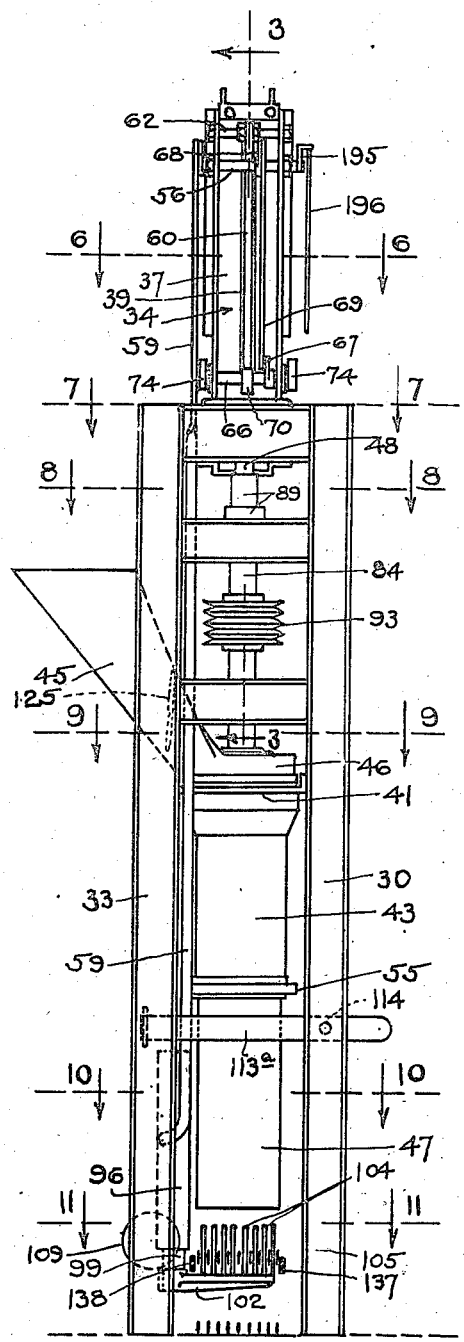
Figure 2 shows a side elevation corresponding to Figure 1.
Figures 3, 4:
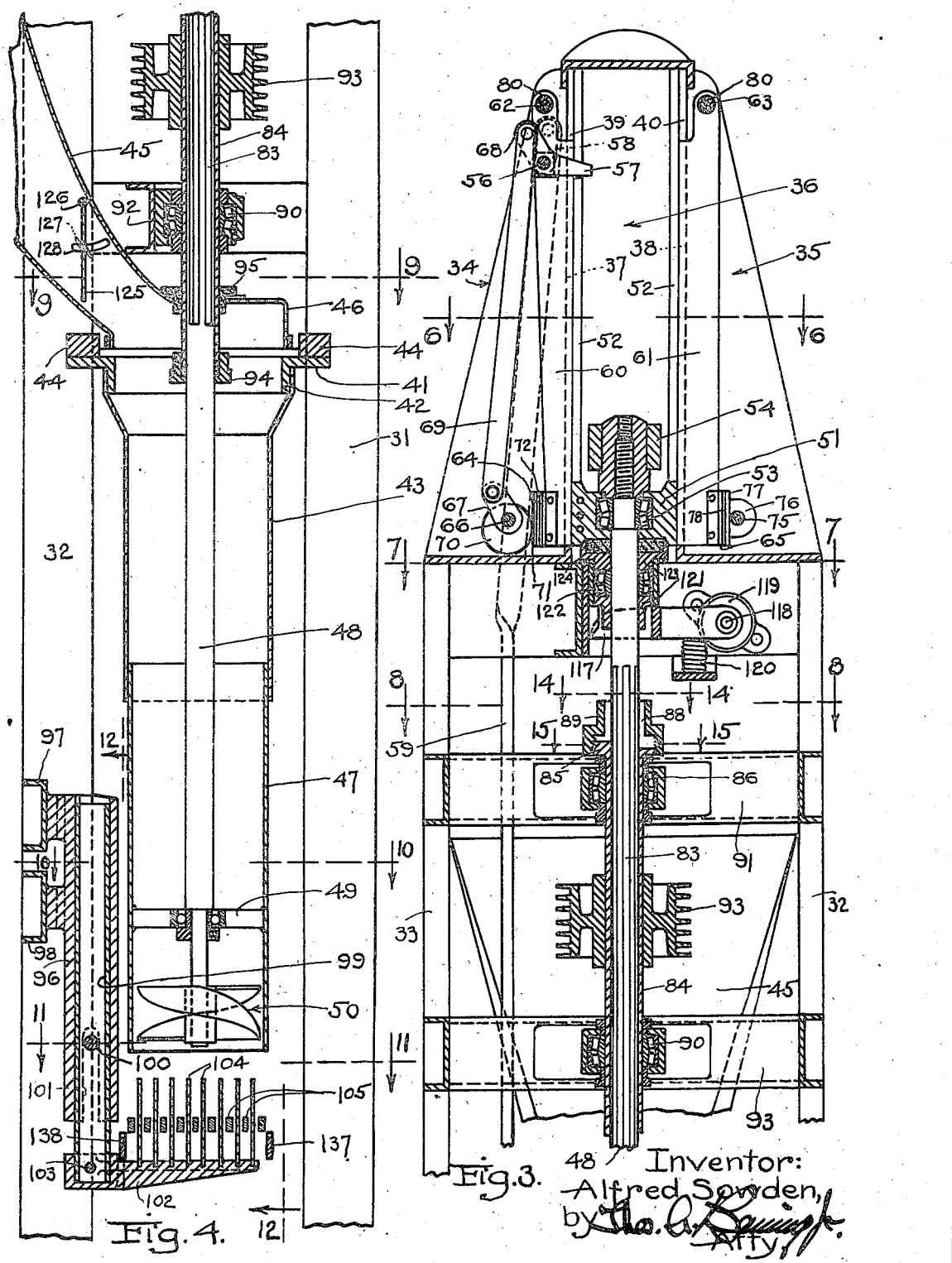
Figure 3 shows on enlarged scale a section through the upper half portion of the machine, taken on the line 3—3 of Figure 2, looking in the direction of the arrows.
Figure 4 shows on enlarged scale a section through the lower half portion of the machine, taken on the line 4—4 of Figure 1, looking in the direction of the arrows, Figures 3 and 4 being therefore at right angles to each other.
Figure 5:
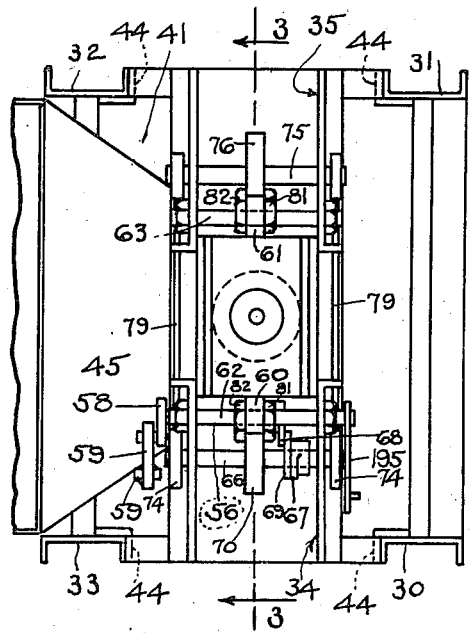
Figure 5 shows a top plan view of the machine of Figures 1 and 2.
Figure 6:
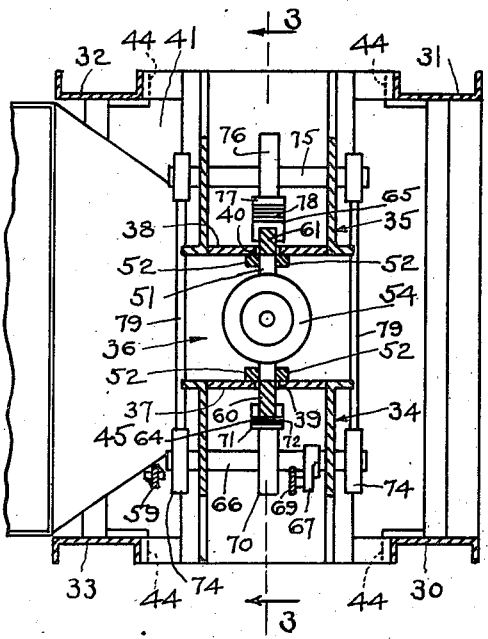
Figure 6 shows a horizontal section on the line 6—6 of Figures 1, 2 and 3, looking in the directions of the arrows.
Figure 7:
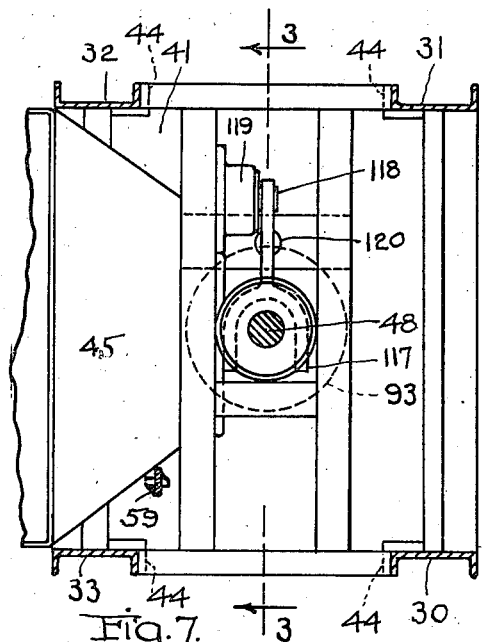
Figure 7 shows a horizontal section on the line 7—7 of Figures 1, 2 and 3, looking in the directions of the arrows.
Figure 8:
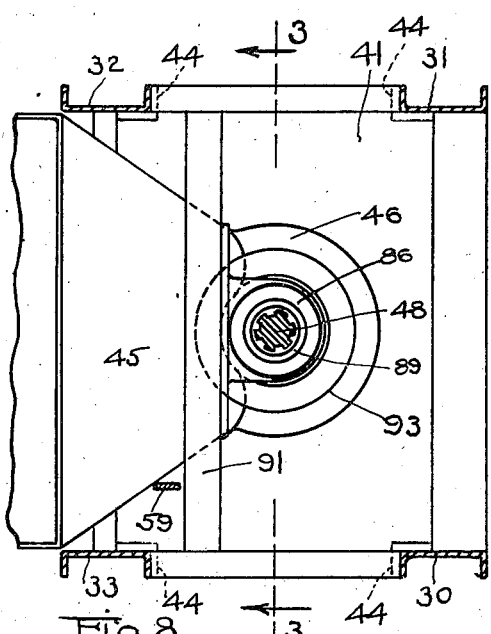
Figure 8 shows a horizontal section on the line 8—8 of Figures 1, 2 and 3, looking in the directions of the arrows.

Reaching upwardly from the upper portion of the framework is the guide structure, including the two facing sections shown in Figures 1, 2 and 3, in particular, designated as 34 and 35. These are separated from each other to provide the vertical open space 36, wherein the upper portion of the vertically movable shaft operates. The walls of this space 36 are defined by the plates 37 and 38, (see Figures 2, 3 and 6), and these walls are vertically slotted as shown at 39 and 40.

Extending across the framework in its mid portion is the bracket or chamber support 41. This has the downwardly extending flange 42 to which the upper portion of the chamber tube 43 is secured; and this bracket 41 is suitably connected to the corner posts of the framework, as by the lugs 44. The supply chute 45 reaches down to the position of this bracket 41, and to the chamber head 46, so that the in-supplied material is delivered into the upper portion of the chamber. This chute 45 receives the material, be it feed or flour, or the like, from the pre-weighing apparatus, in the manner to be presently explained hereinafter.

There is a telescoping tube 47 which telescopes nicely into the chamber tube 43. The auger shaft 48 extends vertically through the chamber head 46, and through the chamber tube 43 and the telescoping tube 47, and the lower portion of this shaft is journalled to the bracket 49 which is in turn connected to the telescoping tube 47, so that not only is a journal connection established but the telescoping tube rises and falls with the shaft. The lower end of the shaft carries the auger 50 which works on the material being packed.

The upper end portion of the shaft 48 carries a cross-head 51 which has the side shoes riding between vertical bars or rails 52 secured to the plates 37 and 38 at the sides of the slots therein, so that this cross-head is effectively guided in its up and down movements. A suitable anti-friction bearing 53 is placed between the cross-head and the shaft, so that the parts are compelled to rise and fall together, and with little friction. The upper end of the shaft preferably carries a head block 54.

When the filling and packing cycle commences the telescoping tube is lowered, together with the shaft and auger, substantially to the position shown in Figure 4. The bag is placed up and around the telescoping tube, and the upper end portion of such bag is firmly gripped to the lower portion of the chamber tube 43 by means of a suitable clamping device, shown at 55. This clamping device is preferably such that, although the bag is firmly held to the chamber tube (which is stationary), during the filling and packing operation, still, at the conclusion of such filling and packing operation the bag may be drawn down away from such clamping device without actually discontinuing the clamping action, thereby ensuring that the bag will be drawn away from the clamping device in a firm smooth condition. Then the clamping device is released prior to introduction of the upper portion of the next bag into place, after which the next clamping action is effected. Such a clamping device is disclosed in my aforesaid co-pending application, Serial No. 273,973.

Extending across the upper portion of the device is a rock shaft 56. This rock shaft carries the crank arm 57 reaching through the slot of the head portion in alignment with the up-travel of the cross-head 51 or a pin carried thereby, so that when the said cross-head reaches a selected upper limit of travel this arm 57 will be engaged and the rock shaft 56 will be rocked counterclockwise (see Figure 3). One end of this rock shaft 56 carries another arm 58 (see Figures 2 and 5), to which is connected the upper end of a link 59, and the parts are so arranged that when the arm 57 stands in the horizontal position shown in Figure 3 the arm 58 stands in a nearly vertical position, but slightly past dead center, so that the down pull on the link 59 locks the rock shaft 56 and the arms 57 and 58 in such position, the arm 57 resting against the bottom of the opening through which it passes; and then, when the shaft 48, together with the auger and telescoping tube and cross-head 51 rise to the engaging position, the arm 57 is thrown up and over towards the left (counterclockwise in Figure 3), and the link 59 is permitted to fall suddenly to its lowermost position.

The bag supporting means is controlled by this link 59, so that when said link is released in the foregoing manner said bag supporting means is also released for delivery of the filled and packed bag. Now devices embodying the foregoing general features are disclosed in my aforesaid co-pending applications. At this point it is to be further noted that the support and lift of the auger, together with the auger shaft, and the telescoping tube, is effected by the action of the auger on the material undergoing treatment in the properly supported bag; and that as the charge of such material flows down from the chute 45 and through the chamber tube 43, and into the lower portion of the bag, presently the auger begins to screw its way upwards through such material, compressing the material as it does so, and drawing the air out from the material undergoing such treatment; and by properly flowing the charge of such material into the bag, in harmony with the auger and shaft speeds, and also in harmony with the form of the auger itself, a very high rate of operations may be established and maintained.

It is also noted that arrangements such as that so far described will permit the shaft and auger and telescoping tube to descend as soon as the filled and packed bag is permitted to descend, since the support of the auger, shaft, and tube, is dependent on the engagement of the auger with the filled and packed material. As I shall presently show, it is very desirable to be able to sustain the vertically movable parts in their raised position independently of the supporting effect of the packed material within the bag, and also to effect such sustaining action of these parts automatically at the completion of each filling and packing operation; and also to be able to secure such sustaining action in certain cases manually. For example, in case of a false operation it might happen that an incomplete charge of material might be delivered to the bag, so that even when the filling and packing of such charge was completed the shaft and other connected parts would not have risen high enough to "kick-off" the arm 57, so that the link 59 would not be released, and the bag supporting device would still function to support the so-partially filled bag in its position around the telescoping tube 47. In such case the machine would continue to operate indefinitely, the auger riding on the top of the material in the bag. By providing means to sustain the shaft and auger and telescoping tube independently of the material in the bag I am able to then drop the falsely partially filled bag away from the parts, and place a new empty bag in position, or take such other steps as may be desirable. It is further to be noted that by locking the auger and shaft and telescoping tube in their elevated condition, at least temporarily, it will be possible to permit the filled and packed bag to descend for disengagement of the upper portion of the bag from the clamping device 55, the amount of which descent is small, and then effect lateral removal of the filled and packed bag away from the machine, since the telescoping tube 47 will be sustained in its elevated position, and will not then fall again until after such lateral removal. I shall now disclose such clamping and locking means.

There is provided a pair of brake shoes 60 and 61 in the head portion or guide structure 34 of the machine. These shoes are in the form of vertical bars carried in close proximity to the edges of the shoes of the cross-head 51, so that by suddenly forcing these brake shoes 60 and 61 towards each other the cross-head is firmly gripped and locked at the position it occupies at that instant. The upper ends of the brake shoes are carried by the cross rods 62 and 63 (either directly or through suitable adjusting means, as hereinafter explained); and the lower portions of these shoes are provided with the abutment plates 64 and 65, respectively. There is a rock shaft 66 which extends across the machine adjacent to the lower portion of the brake shoe 60, and a crank 67 is provided on this rock shaft. The rock shaft 56 is provided with a companion crank arm 68, and a link 69 connects these two crank arms together. Consequently, as the shaft 56 is rocked by the tripping of the arm 57 by the rising of the shaft and auger, etc., the shaft 66 is also rocked. This shaft 66 carries a cam block 70 in position to engage the abutment plate 64 (or a contact plate 71 connected thereto, and adjusted by means of shims 72), so that when the shafts 56 and 66 are rocked as just explained, the lower end portion of the brake bar or shoe 60 is forced inwardly with respect to the cross-head 51.

The outer ends of the rock shaft 66 carry the cams 73 (see Figure 1), which are embraced by the sleeves 74. A cross-pin 75 is passed through suitable slotted openings in the head portion 35, said pin passing adjacent to the abutment plate 65 of the brake bar or shoe 61. A suitable bracket 76 is carried by this pin 75 and engages the abutment plate 65, or the plate 77 connected thereto with adjustment by the shims 78. The outer ends of this pin 75 are connected to the sleeves 74 by the pull rods or links 79, so that the rocking of the shaft 66 effectively forces the lower portion of the brake bar or shoe 60 towards the right, serves, at the same time to draw the lower portion of the brake bar or shoe 61 towards the left. The cross-head 51 is thus effectively clamped and locked between the brake bars 60 and 61, thereby sustaining the shaft, auger and telescoping tube at the elevation which they occupied when the "knock-off" took place. Such locking is also simultaneous with the release of the link 59 whereby the bag support is operated, so that these parts are locked in elevated position at the same time that the filled and packed bag is released. Manifestly, as soon as the shaft 56 is again rocked in a clock-wise direction (viewed as in Figure 3), the brake bars 60 and 61 will be permitted to draw away from each other slightly, and thereby permit the shaft, auger and telescoping tube to fall. This will occur simultaneously with the raising and resetting of the link 59, and the resetting of the bag supporting device.

In order to permit adjustments of the upper end portions of the brake shoes or bars 60 and 61, the following arrangements are shown: Each of the rods 62 and 63 is secured firmly to the head structure 34. At the position of the brake bar 60 (or 61, as the case may be), there is a sleeve 80 eccentrically mounted on such rod 62 (or 63, as the case may be) (see Figures 16 and 17), such sleeve being provided at one end with the head 81, and a nut 82 being threaded on its other end. By this means such sleeve may be clamped firmly to the brake bar in any given rotated position of adjustment; and by merely loosening the nut 82 the sleeve may be slightly turned so as to take advantage of the eccentricity and thereby set the upper end portion of the brake bar slightly backwards or forwards with respect to the cross-head which is to be clamped. It is thus evident that I have provided means for accurate adjustment of both the upper and lower portions of the brake bars so as to secure very accurate clamping action on the cross-head 51.

In my aforesaid issued patent, No. 2,184,474, and also in my said co-pending application, Serial No. 273,973, I have disclosed drives of the auger shaft by means of splined connections from a pulley thereto. One feature of my present invention relates to an improved construction of this splined drive. The same is well shown in Figures 3, 4, 13, 14 and 15. In the present case I have shown the shaft 48 as being provided with the splines 83 which extend along said shaft a distance sufficient to accommodate the full extreme vertical movement of said shaft, and with proper clearances at the ends of such movements. A sleeve 84 is placed over that portion of the shaft 48 which is to be driven, this sleeve preferably reaching downwardly into the upper portion of the hopper chamber as shown in Figure 4. The upper portion of this sleeve is provided with a flange 85 which rests, if desired, on a ball bearing 86, so that the sleeve is held against too far lowering movement. The top face of this flange is provided with a number of clutch depressions, 87 (see Figures 14 and 15), preferably equal in number to the number of shaft splines. There is also provided a series of key blocks 88, one for each spline, and the lower end of each of these key blocks is provided with a clutch element to engage the corresponding clutch depression 87. Thus, by setting these key blocks in place they engage both the splines and also the clutch depressions of the flange 85, thereby locking the shaft to the sleeve 84 through the medium of the splines. A nut element 89 surrounds the spline-key portions of the blocks 88, and also threads onto the outer edge of the flange 85, so that when said nut is drawn up tight it locks all the key blocks in their working positions, while at the same time permitting ready shaft movements up and down with spline engagements.

With the foregoing arrangement, it will be evident that by merely unscrewing the nut element 89, and sliding it upwards a sufficient distance to disengage from the key blocks, said key blocks are released, and may be withdrawn from the shaft and from the flange 85, and a new set may be seated in place and locked by re-threading of the nut element 89. This makes it possible to replace the keys from time to time, without having to disassemble the shaft and auger, and connected parts from the rest of the machine.

The sleeve 84 is also carried by a second ball or other anti-friction bearing 90, separated from the bearing 86 a distance sufficient to establish substantial lateral stability or strength; and these bearings 86 and 90 are conveniently carried by the frame members 91 and 92, and above the chamber head 46. The drive pulley 93 is secured to the sleeve 84 between these bearings 86 and 90 so that direct drive to the sleeve is effected, and said sleeve is well supported in the bearings.

Now it is noted that the sleeve 84 extends down into the upper portion of the packing chamber head 46, (see Figure 4), so that a packing gland nut 94 may be placed thereon for effectively packing the shaft at that point, so as to prevent up movement of flour and other fine material, and also, if desired, to make it possible to lubricate the shaft splines without danger of the lubricant working down into the filling and packing chamber, and into contact with the flour or other material being handled therein. In this connection it is noted that the shaft splines should terminate at such a position that they do not enter into the chamber. Furthermore, it is also noted that the sleeve 84 rotates with the shaft, so that the only function of the packing gland nut 94 is to seal against endwise movements of the shaft in the sleeve, both parts rotating together. A suitable seal, such as a felt washer 95 may be placed around the sleeve 84 at the position where said sleeve enters the packing chamber head 46, and may be readily replaced from time to time as needed.

I shall now disclose the bag supporting means which I have herein shown for supporting the bag in fixed elevation during the filling and packing operations. In my aforesaid issued patent, No. 2,184,474, and my aforesaid co-pending application, Serial No. 273,973, I have disclosed supporting platforms which are swingingly mounted on horizontal transverse pivots or hinges. In the present case I have disclosed a supporting means which is vertically movable directly up and down with respect to the bag tubes and other parts.

Referring to Figures 1, 2, 4, 10, 11 and 12, in particular, there is a vertical tubular guide member 96 carried by suitable cross frame members 97 and 98 adjacent to the general location of the telescoping tube 47. This tubular guide preferably stands to the rear of the telescoping tube position, when looking at the machine from the face thereof opposite to the location of the filling chute 45. In other words, the tubular guide is beneath said filling chute. There is a telescoping member 99 working within this tubular guide; and a cross-pin 100 reaches from the member 99 laterally in both directions to the outside of the tubular guide, working in the vertical slots 101 of said guide, so that said member 99 is retained against rotation during its up and down movements. The lower end of this member 99 carries a platform or shoe 102, being connected thereto by a removable pin 103, so that by merely withdrawing this pin the said platform or shoe may be released, but is normally connected to the member 99.

This platform or shoe 102 carries a series of upwardly extending plates 104, which together constitute a support for the bottom of the bag being filled and packed, said plates extending transversely of the machine, that is, at right angles to the direction of the platform or shoe 102. There is a suitable conveyor of stranded form, shown by the strands 105 in Figures 2, 4, 10, 11, and 12, and the strands of this conveyor are spaced the same as the spacing between the plates 104 just referred to, so that said plates may work up and down between the strands of this conveyor as evident from the various figures. Now, the shoe 102 is accommodated between the top and bottom runs of such a stranded conveyor, so that during its up and down movements it retains its location between said runs of the conveyor; and when said shoe is raised the plates 104 project high enough to carry the bottom portion of the bag being filled and packed, whereas, when said shoe is lowered a relatively small distance, for example, six inches, said plates withdraw slightly below the strands of the upper run of the conveyor, thereby transferring the filled and packed bag to said conveyor for lateral removal to the next operation. In this connection it is to be noted that in order to accomplish this result it is in effect necessary to be able to secure the desired bag transfer with a very small drop of said filled and packed bag, and that result is possible due, among other things, to the fact that the telescoping tube 47 is locked in its raised position at the instant of "knock-off" as hereinbefore explained.

The vertical movements of the shoe or platform 102 are properly effected and harmonized and synchronized with respect to the other functions of the machine as follows: Extending across the central rear portion of the frame of the machine, and directly behind the tubular member 96 is the rock shaft 106. (See Figure 12.) This rock shaft carries the arms 107 and 108, which arms reach in both directions from the shaft. The rear ends of these arms carry the counterbalances 109 and 110, and the front ends of these arms are connected to the cross pin 103, already referred to, by the links 111 and 112. The lower end of the link 59 is connected to one of these arms (107) by the pin 113. Consequently, the vertical movements of the link 59 are harmonized with the rockings of the arms 107 and 108, and therefore, also with the risings and fallings of the platform 102 and plates 104.

Now it is to be noted that the counterweights are so formed and placed that when the platform is in its lowered or discharge position said weights stand out at substantially right angles, as in Figure 10, whereas when the platform is in its raised or bag supporting position said weights stand in a substantial vertical position, as in Figure 2. Consequently, when the filled and packed bag has been delivered to the stranded conveyor the tendency is for the weights to swing down and raise the platform, and also to raise the link 59, which would recock the arm 57 (see Figure 3), ready for commencement of another cycle of movements. I have, however, provided means to lock the link 59 in its lowered position, which position it assumes when it is released by the attainment of the upper limit of movement by the shaft and cross-head 51, so that said link will not be permitted to again move upward until purposely released by the operator. This locking means includes the forwardly extending bar 113a, the rear end of which is hinged to the frame of the machine so as to permit said bar to rock back and forth in a horizontal direction, a spring 114 serving to normally press the bar towards the axis of the machine. This bar has a cam lug 115 on its inner face in position to be engaged by a similar cam lug 116 of the link 59, so that when said link is released by the attainment of the upper limit of movement by the shaft, and is forced down by the weight of the filled bag standing on the plates 104, these cam lugs will lock together and the link will be retained in its lowered position and against the returning tendency of the weights 109 and 110, until the operator purposely presses laterally against the bar 113a so as to again release the link 59, allowing it to rise to the recocking position under the impulse of the weights 109 and 110. When thus released the parts are again set into operation, and a new cycle of movements is instituted.

It is noted that although, when the arms 107 and 108, and the weights 109 and 110 stand in the vertical position they exert no vertical component of force such as needed to retain the platform or shoe 102 and plates 104, together with anything on them, in raised position, still, when the bar 113a is first released by lateral movement as just explained, the weights exert their full force to create a vertical component of force to raise the above parts, and as these weights swing down the platform or shoe and the plates 104 will ride up high enough to ensure the locking of the upper end of the link 59, ready for the next "knock-off" to occur, so that the parts are re-set in an easy and rapid manner.

It will now be seen that when the bar 113a stands in position with the link 59 locked down against the force of the weights, we have the following condition; the shaft and auger and telescoping tube have attained their upper limit of movement, and the brake bars 60 and 61 have locked said parts in that position, raised, and at the same time the platform or shoe 102 with the plates 104 has been suddenly released. Due to the relatively great weight of the filled bag, for example, one hundred pounds, the weights are greatly overpowered, and the platform and filled bag move down rapidly to transfer the bag to the stranded conveyor, and the weights swing backward and upward quick enough to enable the cam blocks 116 and 115 to engage so as to lock the parts in this condition. In fact, such movement will occur fast enough to ensure complete locking of the parts with the plates 104 slightly below the level of the stranded conveyor, due to the action of inertia in the movements.

With the parts in the above mentioned condition the operator has merely to slip a fresh empty bag into place with its upper portion engaged with the bag clamping device 55 (disclosed in detail in my co-pending application, Serial No. 273,973), the bag depending to a position slightly below the elevation to which the plates 104 will rise when the platform or shoe 102 is released. Then, by merely shifting the bar 113a slightly sidewise the parts are released, the plates 104 are raised to press up against the bottom of the bag, the cross-head 51 is released, and the shaft, auger, and telescoping tube are allowed to fall to their lowermost position. At the same time, as will be presently explained, the fresh charge of material is permitted to move rapidly into the bag through the chute 45, and the new operation is under way.

Now, at the instant of release of the brake bars 60 and 61, due to lateral shifting the bar 113a, and upward movement of the link 59, the shaft, auger and telescoping tube will commence to drop. By the time that the auger approaches its lower limit of such movement some of the fresh charge of material will have descended through the chute 45 into the bottom of the bag, so that the auger will rest thereon and commence its packing operation, the rest of the charge descending rapidly into the bag. The presence of some material in the bottom of the bag will somewhat cushion the falling of the parts, but in order to prevent undue impact I have provided definite means to snub such falling action. The same constitutes the fork 117 which embraces the shaft, said fork being carried by the stem 118 of a shock-absorber or snubber 119 carried by the frame of the machine. A spring 120 tends to raise this fork to an upward position suitably limited in any convenient manner. The fork engages a collar 121 which surrounds the shaft at a point below the cross-head, and a suitable anti-friction bearing 122 is placed on the shaft between said collar 121 and the plate 123. A resilient block 124 is placed on the plate 123 in position to receive the direct impact of the descending cross-head, and then the entire unit may slip down with operation of the snubber to its lowermost limit of movement. Arrangements similar to this are also disclosed in my co-pending application, Serial No. 273,973, as well as in the above mentioned patent, No. 2,184,474.

It is here noted that as each batch of material is suddenly delivered to the filling and packing machine the operation of the latter would not be possible under the best conditions, without provision for means to more or less level out and make even the delivery of such batch of material over a definite but small interval of time, for example, two seconds. I therefore prefer to carry the chute 45 upwards some distance above the level of the packing chamber head 46, so that a sufficient volume is thus provided within such portion of the chute to receive the weighed batch of material, and then I provide a swinging damper 125 across the lower portion of the chute, and relatively close to the point of delivery into the chamber head 46, said damper being carried by the transverse shaft 126. Suitable means, such as the lock nut 127, together with the arcuate slotted opening 128 are provided for locking the damper in any selected position, so that the size of the opening beneath the lower damper edge may be regulated to that amount which will permit a more or less even flow of the material of the batch down into the packing chamber during the small time interval which experience has shown to be proper for filling and packing the material in question. For example, in the case of operation on flour, on six second cycles, one hundred pounds per operation, probably two seconds should be used in flowing the batch down into the filling and packing chamber, during which time the auger is rising through the incoming material and packing it into the bag beneath the auger.

The conveyor adjacent to the bag support may serve to carry the filled and packed bags laterally to any convenient point; but manifestly these filled and packed bags must be closed and sealed.

As shown in Figures 1, 2, 4, and 12, the conveyor must also be supported at such a level, and the clearance between the top and bottom runs thereof must be such as to permit of proper up and down movements of the shoe or platform 102, with the plates 104. The filling and packing unit is conveniently carried by casters or the like 141 on the lower ends of the corner posts 30, 31, 32 and 33, said casters riding on two rails 142 and 143.

Sometimes it will be desirable to trip off the link 59 of the packer manually instead of waiting for automatic operation thereof. For this purpose I have provided the arm 195 on the rock shaft 56, properly positioned, so that by pulling this arm 195 down, as by use of the cord 196, the parts may be tripped off instead of causing such tripping by engagement of the shaft head with the arm 57 in the normal manner.

Referring to Figure 18 I have therein shown one form of drive for the pulley 93 on the auger shaft. In this case the driving motor 190 is carried by a bracket 192 reaching forwardly from the upper portion of the packer frame, the shaft 191 of such motor being provided with the pulley 194 in line with the auger shaft pulley 93. Suitable V-belts or the like 193 are provided between the two pulleys to cause shaft drive from the motor.

It will be noted that the motor 190 is placed opposite to the location of the chute 45 of the packer, so that the weights of these parts counterbalance each other. By this means a more stable arrangement is provided; and this is very desirable in view of the fact that the packer is carried by the casters 141 travelling on the tracks or rails, so that the packer frame must be practically self-supporting and self-contained. The form of the bracket 192 may be of any suitable selection, as for example, one in which the belts are kept properly tensioned by spring means or the like.

While I have herein shown and described only certain embodiments of the features of my present invention, still I do not intend to limit myself thereto, except as I may do so in the claims to follow.

I claim:

1. In a machine of the class described, the combination with a packing chamber tube, suitable material supply means to the same, a vertically movable tube telescopingly mounted with respect to said packing chamber tube, a vertically movable shaft extending axially through said tubes, an auger on the lower portion of said shaft, and movable means adjacent to the lower end of the telescoping tube adapted to support a bag surrounding said telescoping tube, of means to lock said bag support means in bag supporting position, means in conjunction with the vertically movable shaft effective to make ineffective said bag support locking means at a predetermined elevation of the shaft during a filling and packing operation, and means to lock the shaft, auger and telescoping tube in elevated position and simultaneously make ineffective said bag support locking means at said shaft elevation to thereby retain said shaft and auger and telescoping tube in elevated position when said bag support is released, substantially as described.

2. In a machine of the class described, the combination with a tubular filling chamber, means to deliver material into the upper portion thereof, a vertically movable shaft and auger element extending axially within said chamber, a telescoping tube in connection with said shaft and auger element and a connection between the shaft and telescoping tube to ensure vertical movements of the shaft and tube conjointly, and means to drive the shaft, of means to support the lower portion of a bag stationary adjacent to the telescoping tube during a filling operation, and to release the filled and packed bag and transport the same laterally at the conclusion of a filling and packing operation, comprising a stranded belt conveyor travelling horizontally adjacent to the lower end of the telescoping tube when said tube is in its lowered position, a shoe mounetd between the runs of said belt conveyor and vertically movable between said runs, and a series of vertically extending plates carried by said shoe and working between the strands of the upper run of the conveyor, together with automatic means to lock the shaft and tube in raised position at a predetermined elevation and interconnections between said shoe and the vertically movable shaft and auger element, whereby when said shoe is in raised position said plates extend above the upper run of the conveyor to support a bag thereon, and whereby when said shoe is lowered, said tube and shaft are sustained in elevated position and said plates move to a position below the upper run of the conveyor to thereby transfer their load to said run free of interference from said tube and shaft, substantially as described.

3. In a machine of the class described, the combination with a vertically movable tube, a vertically movable shaft axially within said tube, an auger on said shaft, and means to connect the shaft and tube together for conjoint vertical movements of said parts, of means to support the lower portion of a bag adjacent to the lower end of the tube during a filling and packing operation and to lower said bag and convey it laterally away from the tube location when a filling and packing operation has been completed, comprising a stranded conveyor having its top run beneath the lower end of the tube when said tube is in lowered position, a shoe vertically movable between the runs of the conveyor, and a series of plates carried by the shoe at locations between the strands of the conveyor, whereby when the shoe is in raised position said plates project above the strands of the conveyor to support the filling bag, and whereby when the shoe is lowered between the conveyor runs said plates move to a position to carry their top edges below the strands of the conveyor to thereby transfer the filled bag to the conveyor strands together with means to automatically sustain the tube and shaft in elevated position at such time, substantially as described.

4. In a machine of the class described, the combination with a vertically movable tube, a vertically movable shaft axially within said tube, an auger on said shaft working within the tube, means to connect the shaft and tube together for conjoint vertical movements of these parts, and means to lock said parts in an elevated position when said elevation is attained, of means to support a bag beneath the lower end of the tube during the filling and packing operation, and to convey the filled and packed bag laterally away from the filling position at the conclusion of a filling and packing operation, comprising a stranded conveyor having its top run in proximity to the lower end of the lowered tube, a shoe vertically movable between the runs of said conveyor, a series of plates on the shoe working between the strands of the top run of the conveyor, means to lock said shoe in raised position during the filling and packing operations of the shaft and auger, and means to permit lowering of the shoe and plates at the conclusion of a filling and packing operation and when the tube, shaft and auger are locked in raised position to thereby permit lateral transfer of the filled bag by the conveyor without interference by said shaft and tube, substantially as described.

5. In a machine of the class described, the combination with a vertically movable tube, a vertically movable shaft axially within said tube, an auger on said shaft working within said tube, means to connect the shaft and tube together for conjoint vertical movements of these parts, and means to lock said parts in an elevated position when said elevation is attained, of means to support a bag beneath the lower end of the tube during the filling and packing operation, and to convey the filled and packed bag laterally away from the filling position at the conclusion of a filling and packing operation, comprising a conveyor having its top run in proximity to the lower end of the lowered tube, a shoe vertically movable between the runs of the conveyor, means carried by said shoe to support the lower end of the bag when the shoe is in raised position, and to transfer said lower bag end to the top conveyor run when the shoe is lowered, together with means to retain the shoe in raised position during the filling and packing operations, and to permit lowering of the shoe harmoniously with the locking operation aforesaid, to thereby permit lowering of the filled and packed bag and transfer thereof to the conveyor while the tube and shaft and auger are locked in raised position for lateral transfer of the filled and packed bag without interference by the tube and shaft, substantially as described.

6. In a machine of the class described, the combination with a vertically movable tube, means to supply material into the upper end thereof, a vertically movable shaft axially in said tube, a connection between said shaft and tube effective to cause them to rise and fall together, an auger on the lower portion of said shaft, and suitable vertically movable means to support a bag in stationary position around said tube during a filling and packing operation, of means to lock the bag supporting means in elevated bag supporting position during a filling operation, means to lock the shaft, auger and tube in elevated position, means moving with the shaft to move said last named locking means to locking position when the shaft, tube, and auger reach a predetermined elevation, and means to disengage the bag support simultaneously with locking of said shaft, tube, and auger as aforesaid, to thereby retain said shaft and auger and tube in elevated position when said bag support is disengaged, substantially as described.

7. In a machine of the class described, the combination with a vertically movable tube, means to supply material into the upper end thereof, a vertically movable shaft axially in said tube, a connection between said shaft and tube effective to cause them to rise and fall together, an auger on the lower portion of said shaft, and suitable vertically movable means to support a bag in stationary position around said tube during a filling and packing operation, of means to lock the bag supporting means in elevated bag supporting position during a filling operation, means to lock the shaft, auger and tube in elevated position, means moving with the shaft to move said last named locking means to locking position when the shaft, tube, and auger reach a pre-determined elevation, and means to disengage the bag support simultaneously with the locking of said shaft, tube, and auger as aforesaid; to thereby retain said shaft, auger, and vertically movable tube in elevated position when said bag support is disengaged, and means under the control of the operator effective to release said last mentioned locking means to permit descent of the shaft, tube, and auger under operator control, substantially as described.

8. In a machine of the class described, the combination with a vertically movable packing tube and means to supply batches of material into the upper end thereof, together with means to pack such material downwardly in the tube, of means to support a container around the tube and to remove the filled and packed container away from the position of the tube, comprising a series of spaced parallel conveyor strands mounted for lengthwise travel beneath the lower end of the tube and container together with a shoe member mounted for vertical movement beneath the strands of the conveyor, and having a series of upwardly extending plates adapted for vertical movement between the strands of the conveyor, said shoe member being adapted for vertical movements of magnitude to carry the upper ends of the plates between horizontal planes above and below the conveyor strands, and means to move the packing tube and the shoe member vertically in harmonious relationship with the packing tube in raised position during lowering movements of the shoe member, whereby filled and packed containers are lowered and rest on the stranded conveyor while the packing tube is in raised position, substantially as described.

9. In a machine of the class described, the combination with a vertically movable packing tube and means to supply material into the upper end thereof, of means to support a container around the tube and to remove filled containers away from the position of the tube, comprising a series of spaced parallel conveyor strands mounted for travel lengthwise beneath the lower end of the tube and container together with a shoe member mounted for vertical movement beneath the strands of the conveyor, and having a series of upwardly extending plates adapted for vertical movement between the strands of the conveyor, said shoe member being adapted for vertical movements of magnitude to carry the upper ends of the plates between horizontal planes above and below the conveyor strands, and means to move the tubular packing tube and the shoe member vertically in harmonious relationship with the packing tube in raised position during lowering movements of the shoe member, whereby filled containers are lowered and rest on the stranded conveyor while the packing tube is in raised position, substantially as described.

10. In a machine of the class described, the combination with a vertically movable packing tube and means to supply material into the upper end thereof, of means to support a container around the tube and to remove filled containers away from the position of the tube, comprising a series of spaced parallel endless strands mounted for travel lengthwise beneath the lower end of the tube and container with the upper runs of the conveyor strands travelling beneath the lower end of the tube in bag receiving and carrying position, together with a shoe member extending and working between the upper and lower runs of the conveyor strands, and a series of upwardly extending plates on said shoe member spaced between the strands of the conveyor and of vertical dimension to project above the upper runs of the strands when the shoe member is in raised position and to move to positions beneath said upper runs when the shoe member is in lowered position, together with a laterally extending vertically movable mount for said shoe member, and means to retain the mount for the shoe member in lowered position and to simultaneously retain the packing tube in raised position while the packing tube is in raised position, substantially as described.

11. In a machine of the class described, the combination with a vertically extending packing tube, means to supply material into the upper end thereof and vertically movable means to pack material supplied into the tube, of means to support a container around the tube and to remove filled containers away from the position of the tube, comprising a series of spaced parallel endless strands mounted for travel lengthwise beneath the lower end of the tube and container with the upper runs of the conveyor strands travelling beneath the lower end of the tube in bag receiving and carrying position, together with a shoe member extending and working between the upper and lower runs of the conveyor strands, and a series of upwardly extending plates on said shoe member spaced between the strands of the conveyor and of vertical dimension to project above the upper runs of the strands when the shoe member is in raised position and to move to positions beneath said upper runs when the shoe member is in lowered position, together with a laterally extending vertically movable mount for said tube means to lock the mount in raised position with the plates in raised position, and interconnections between the vertically movable packing means and said mount locking means effective to release the locking means when the packing means attains a predetermined elevation, substantially as described.

ALFRED SOWDEN.